United States Patent [19]
Willetts

[11] 3,767,222
[45] Oct. 23, 1973

[54] VEHICLE SUSPENSION STRUCTURE
[76] Inventor: Elwood H. Willetts, 102 S. Penataquit Ave., Bay Shore, N.Y. 17706
[22] Filed: Nov. 9, 1971
[21] Appl. No.: 196,982

[52] U.S. Cl. .......................... 280/104.5 B, 267/54
[51] Int. Cl. .............................................. B60g 5/06
[58] Field of Search ............... 280/104.5 B; 267/54, 267/63

[56] References Cited
UNITED STATES PATENTS
3,062,387   11/1962   Lavis .......................... 267/63 R X
2,988,352   6/1961    Masser ..................... 280/104.5 R X
2,455,989   12/1948   Frazier ....................... 280/104.5 B
FOREIGN PATENTS OR APPLICATIONS
1,349,363   12/1963   France ....................... 280/104.5 B Primary Examiner—Philip Goodman
Attorney—Paul J. Sutton

[57] ABSTRACT

This invention includes an elastomerically resilient load equalizing means interposed between the adjacent ends of pairs of leaf springs on each of opposite sides of a multiple axle vehicle. The load equalizing means functions (1) to resiliently equalize a varying load between its opposing axles; and (2) to isolate the excitations of each adjacent spring end and its supporting axle from both the cross shaft of the frame (sprung mass), and from the opposing adjacent spring end and its respective supporting axle, through deflection of pressure resistant elastomers. The interconnection of said adjacent spring ends and said resilient equalizing means is restrained against disconnection at rebound.

9 Claims, 9 Drawing Figures

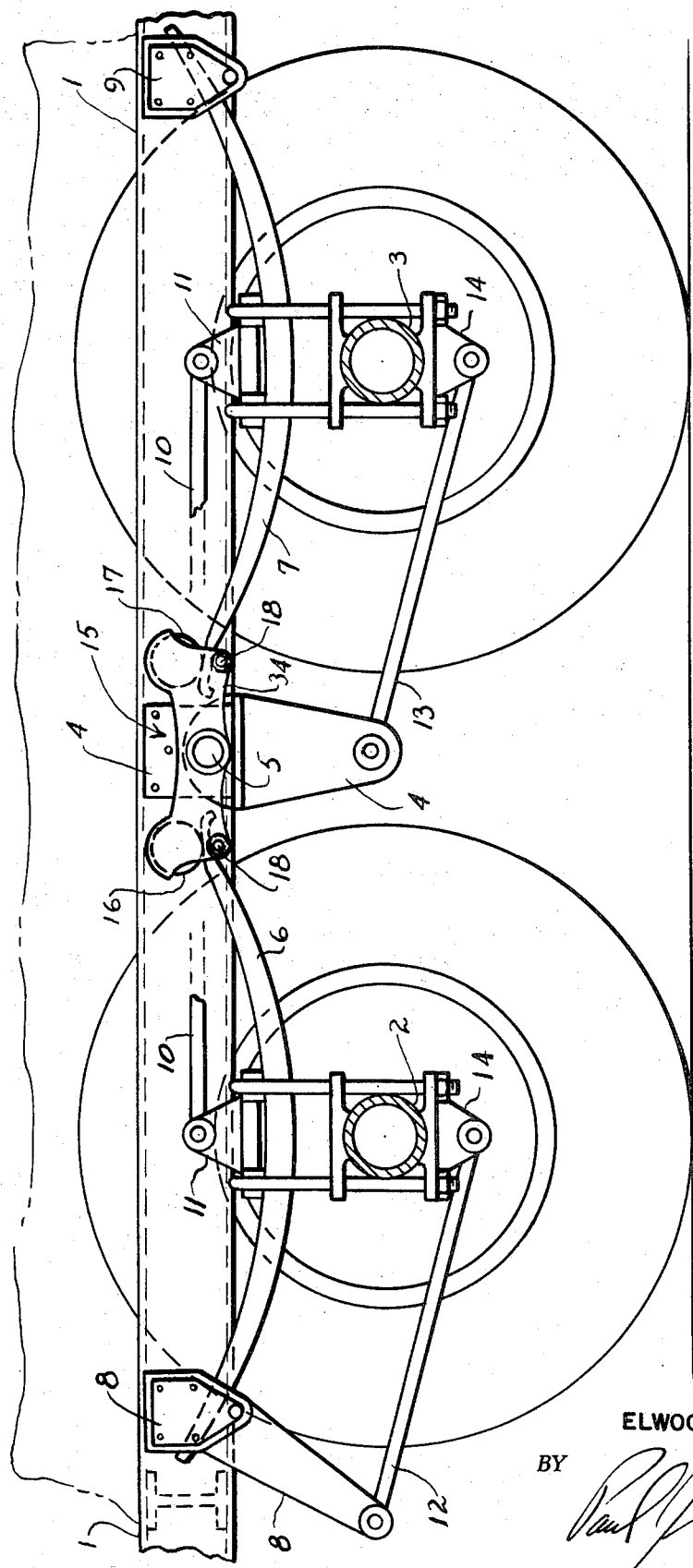

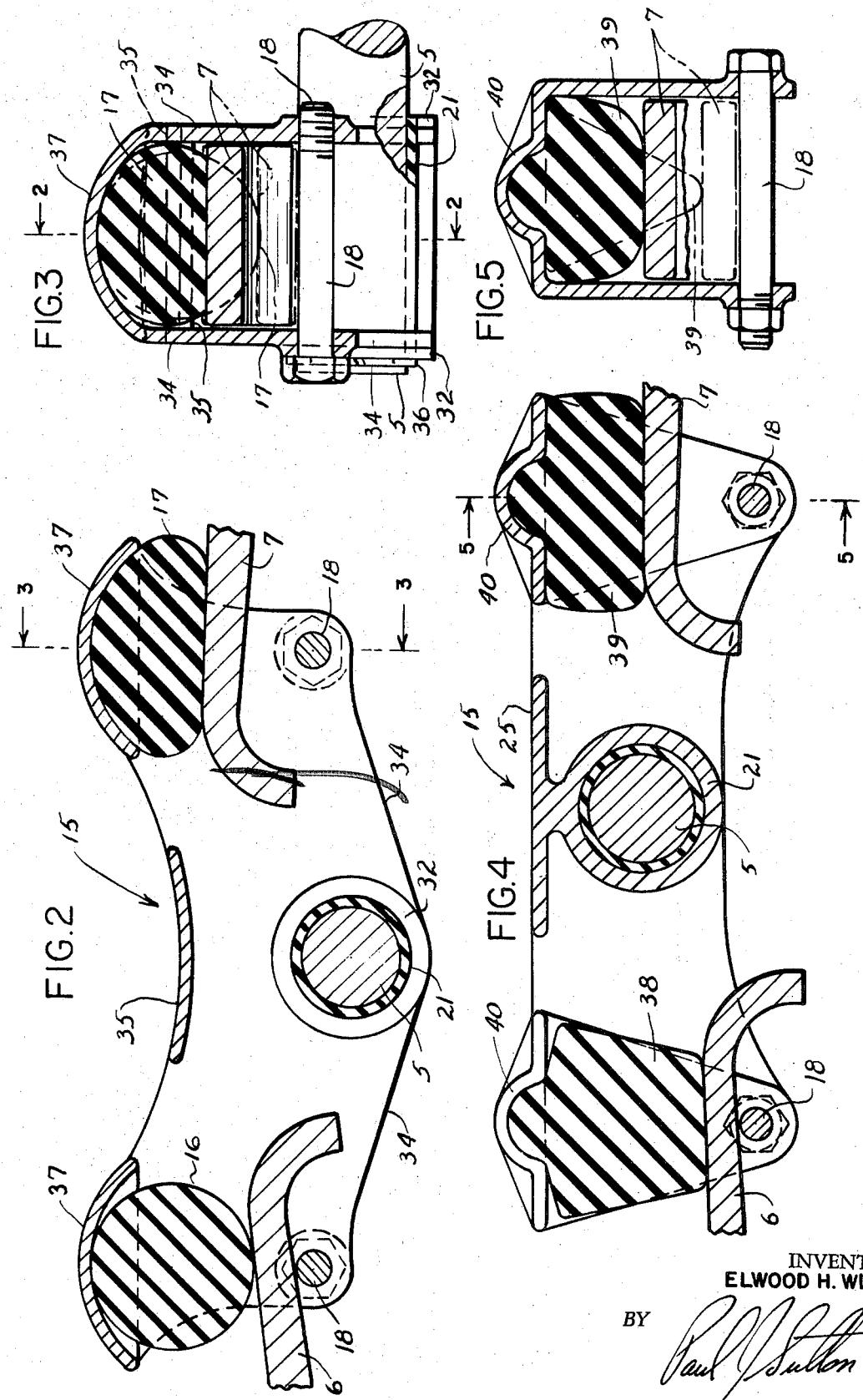

PATENTED OCT 23 1973 3,767,222

INVENTOR.
ELWOOD H. WILLETTS
BY
Paul J. Sutton
ATTORNEY

VEHICLE SUSPENSION STRUCTURE

A main object of this invention is to provide an improvement in the equalization of load between a plurality of axles of a multiple axle vehicle suspension structure, whereby the impact of load transfers between the vehicle axles is cushioned in order to isolate the impact of road irregularities from the frame which is supported by said load equalizer.

Another object of this invention is to isolate the excitations of each of said vehicle axles from both the sprung mass, which comprises the vehicle frame, and from the opposing axle. Such isolation according to this invention will serve (1) to improve the ride of the spring mass, and (2) to isolate the excitations of one vehicle axle from a similarly excited opposing axle, thereby preventing a combined excitation approximating their natural frequency which, in turn, could and, according to conventioanl suspension structures, does result in a resonant condition. It is this road excitation-induced resonance, which is eliminated by the present invention, that causes vehicle ride instability. Yet another object of the present invention is to provide an elastomerically resilient load equalizing structure possessing a progressively increasing spring rate which is a function of vehicle load conditions. My invention contemplates and includes provision of an elastomeric member of predetermined shape which is capable of exhibiting varying spring rates as the vehicle load varies, and which cooperatively engages an elastomer seat formed with surfaces of a predetermined shape capable of yet further providing adjustability and the ability to vary said spring rate in a manner designed to anticipate and eliminate the resonant causes of ride instability. My invention is applicable to all forms of vehicle and/or transport suspension structures and has particular after-market advantages in that vehicles equipped with conventional suspension structures may be inexpensively and rapidly modified to include the structure defined in more detail below.

Still another object of this invention is to accomplish the aforestated objectives safely, economically and profitably to manufacture and user alike.

This invention differs from that disclosed in my U.S. Pat. No. 3,361,442 wherein a tubular elastomer stressed in torsional shear interconnects the opposing elements of an articulated beam trunnioned on a frame bracket to resiliently equalize the axle loads and to isolate the excitations of the opposing axles.

This invention also differs from that disclosed in my U.S. Pat. No. 3,484,118 wherein a helically coiled torsion spring trunnioned on a frame bracket is torsionally deflected when loaded to equalize the axle loads and to isolate the excitations of the adjacent spring ends. Said patent also discloses use of helical coiled springs saddled from adjacent ends of leaf springs to isolate excitations of adjacent leaf springs from a non-deflectable equalizer pivoted on a frame bracket cross shaft.

BRIEF DESCRIPTION OF THE DRAWINGS

FIG. 1 is a side elevational view of a preferred embodiment of the invention in relation to a complete suspension structure.

FIG. 2 is a fragmentary sectional elevational view looking along line 2—2 of FIG. 3 and illustrates an embodiment of the present invention in which spherical elastomers are employed.

FIG. 3 is a sectional elevational view looking along line 3—3 of FIG. 2.

FIG. 4 is a fragmentary sectional elevational view similar to FIG. 2 illustrating an alternative embodiment of my invention in which an optional form of elastomer is illustrated.

FIG. 5 is a sectional elevational view looking along line 5—5 of FIG. 4.

Figure 6:
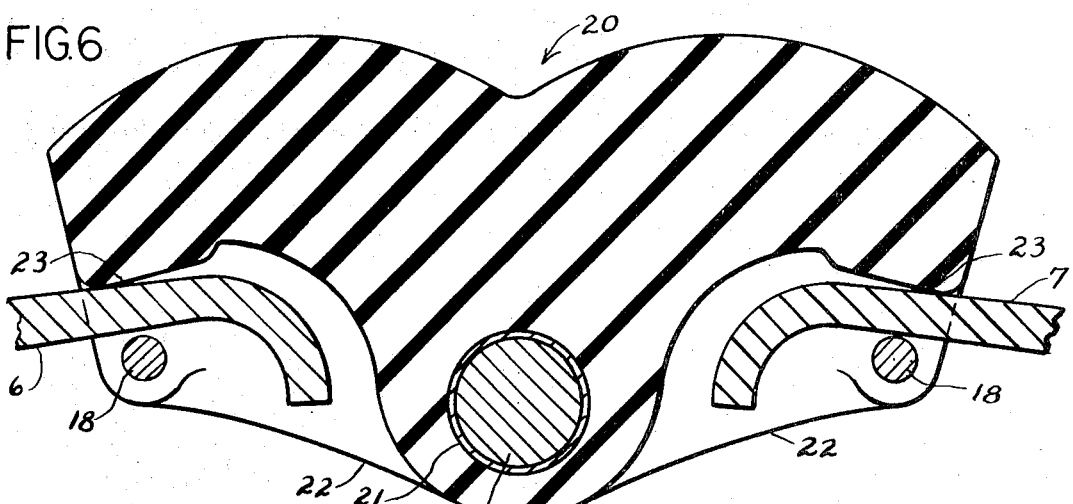
FIG. 6 is a fragmentary sectional elevational view of an elastomeric beam form contemplated by this invention and illustrates said beam in a load-free state.

Before looking in more detail at the drawings illustrating this invention, it must be emphasized here that my invention is applicable both to vehicles now in use, as well as to vehicles yet to be manufactured. It is contemplated by this invention that existing suspension structures, including for that matter those of my design and previously patented, may be inexpensively modified to include the suspension structure described below. A principal advantage of this after-market applicability resides in the fact that a conventional suspension can be equipped with my invention without altering the height of the suspension.

Referring now to FIG. 1 which primarily portrays the location in a vehicle structure of one form of the invention which includes the use of a load equalizer or equalizer member generally referred to here by numeral 15: A horizontal vehicle frame member 1 is shown extending longitudinally on transversely opposite sides of a vehicle, with axles 2 and 3 disposed equidistant from a trunnion bracket 4 to which a shaft 5 is secured, and on which shaft a resilient load equalizer 15 is trunnioned. On transversely opposite ends of axles 2 and 3, leaf springs 6 and 7 are mounted in cooperative support of said resilient load equalizer 15 at their adjacent ends, while at their longitudinally extending distant or outer ends said springs 6 and 7 support frame 1 at brackets 8 and 9.

Axle 2 is aligned with frame 1 by a rod 12 which interconnects axle bracket 14 and frame bracket 8. Axle 2 is torsionally restrained by rod 10 which interconnects bracket 11 and frame 1. Axle 3 is likewise aligned by a rod 13 interconnecting axle bracket 14 and trunnion bracket 4, with torsional restraint afforded by rod 10 as with axle 2. Spherical elastomers 16 and 17, which may be considered to operatively comprise a portion of load equalizer 15, and which are preferably, but not limited to, a polyurethane-type material which may, at the user's option, be impregnated with fiber, interconnect adjacent spring ends 6 and 7 with the load equalizer 15 below concave spherical cups vertically centered at and integrally formed as part of both ends of equalizer 15. Rebound stops 18, shown in FIG. 1, are provided under said spring ends to prevent disengagement upon rebound and may exist in the form of a bolt (FIG. 3) or may be formed as an integral part of equalizer 15 or rigidly secured, such as by welding, to said equalizer member 15. In operation, the pressure resistant and resilient spherical elastomers 16 and 17 are captively and compressively deflected between the supporting adjacent spring ends 6 and 7 and the respective inverted spherical cups of the load equalizer 15, thus providing resiliency of load equalization, while also isolating the excitations of adjacent spring end 6 and its axle 2, from the cross shaft 5 of frame bracket 4, and, from the opposing spring end 7 and its axle 3.

The form of the present invention illustrated in FIG. 1 is further portrayed in enlarged detail in FIGS. 2 and 3, wherein similar reference numerals denote similar parts. Referring now to FIGS. 2 and 3 which depict a preferred form of the invention wherein the resilient equalizing means 15 includes an elastomerically isolated, non-resilient pivoted beam formed with spherical surfaces or cups 37 at its upper extermities (see FIG. 2), which spherical cups 37 captively restrain and normally contact a pair of elastomeric spheres 16 and 17. FIG. 3 illustrates the fact that spherical cups 37 are integrally formed with vertically extending flanges 34 which, in turn, are pivotally mounted on shaft 5 of frame bracket 4 with a bushing 21 therebetween. A web 35 ridigly interconnects the upper central extremities of flanges 34 and is disposed above and spaced from hub 32 shown in FIG. 2.

FIG. 2 has been drawn to indicate elastomeric sphere 16 in a free or completely unloaded condition, supported above leaf spring 6 such that it is restrained and in contact with the upper surface of leaf spring 6 and the concave spherical surfaces of spherical cups 37. Leaf spring 6, in turn, is supported at its lower surface near the end thereof by a rebound stop 18 which projects through flanges 34 and can comprise a bolt, as shown in FIG. 3, or can exist in the form of an integral protuberance formed from or welded to said beam. Rebound stop 18 functions to restrain spring 6 from freeing elastomer 16 from captivity within the lips of spherical cup 37.

In a preferred embodiment of the present invention, the spherical radii of cups 37, which of course may be identical, are greater than the radii of spherical elastomer 16 and 17, as readily seen in FIG. 2. FIG. 2 further illustrates the result of spherical elastomer 17 being loaded via deflection of spring 7 such that it conforms to the confining concave surface of cup 37 in a flattened condition.

Illustrating a practical example of the preferred embodiment of the present invention shown in FIGS. 2 and 3, for an elastomer capable of withstanding a deflection of 33 percent of its free diameter, the spherical elastomer would be 3 inches in diameter for a 1 inch deflection at design load. Since this assumed 1 inch deflection at both ends of resilient load equalizer 15 must be averaged with zero deflection at the longitudinally extending ends of leaf springs 6 and 7 of FIG. 2, for example, the results in deflection of frame 1 due to a 1 inch deflection of said resilient load equalizer 15 will be only 0.5 inch.

Referring now to FIGS. 4 and 5, another optional or preferred form of the invention may comprise a semi-pyramidal form of elastomer, illustrated in FIG. 4 as elastomeric members 38 and 39, which engage the upper surfaces of spring ends 6 and 7. It is within the scope of the present invention to include the use of such semi-pyramidal forms of elastomers, such as members 38 and 39 with a load equalizing beam such as that already described for FIG. 2, or, in the alternative, with a load equalizing beam of the type and shape illustrated in FIG. 4 and designated numeral 25. It is further within the scope of the present invention to vary the elastomeric members such that other suitable and predetermined shapes are employed. In the embodiment of the present invention shown in FIG. 4, elastomeric members 38 and 39 are illustrated with a convex upper protuberance or portion which is restrained within and in contact with concave spherical seats designated numeral 40 in FIGS. 4 and 5. It is contemplated by this invention to include the bonding, cementing or adhesion of said upper convex protuberance to seat 40, however such bonding or cementing is not necessary for the proper functioning of my invention.

Alternate preferred forms of the structure illustrated in FIGS. 2–5 may include positive securement of the elastomeric members and the respective seats, such as by the inclusion of a stud (not shown) embedded in or bonded within the elastomeric members such that a portion of the stub will protrude through the load equalizing beam seats for inexpensive and positive securing, thereby preventing undesirable movement or displacement of the elastomer in service. This invention further contemplates any conventional form of attachment of the elastomeric member to a non-deflectable pivoted equalizing beam.

Figure 7:
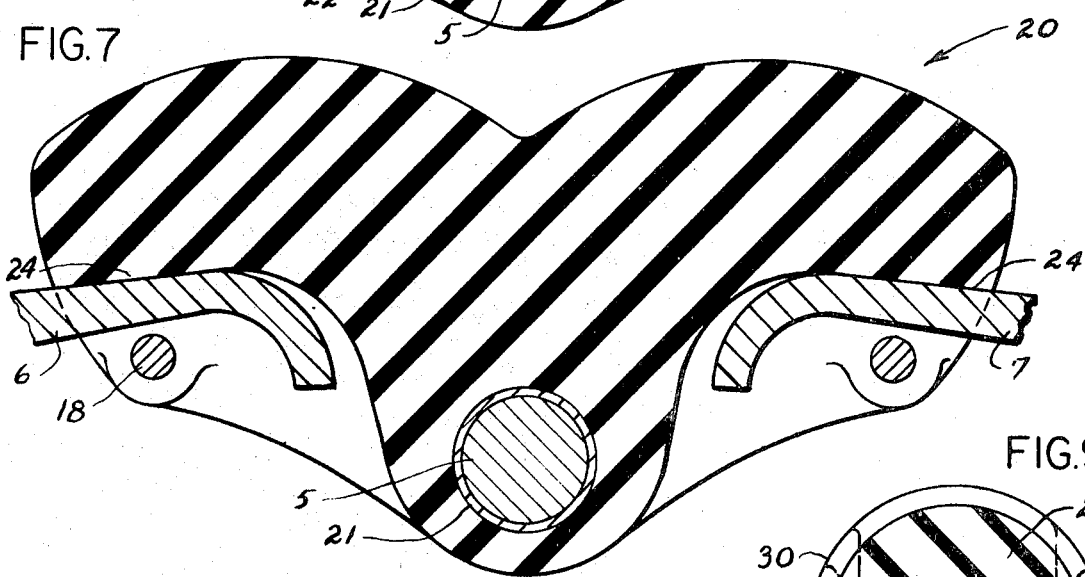
FIG. 7 is a fragmentary sectional elevational view of the beam illustrated in FIG. 6, but shown in a deflected or "loaded" state.

Yet another embodiment of this invention includes the provision of a solid or integral and deformable elastomeric beam 20 which comprises a load equalizer and which is supported at its ends on adjacent spring ends 6 and 7 such that the sprung mass is supported effectively midlength of beam 20 on trunnion shaft 5. Beam 20 is formed with downwardly extending flanges 22 spaced astride leaf ends 6 and 7 and serves, among other things, to anchor rebound stops 18 which project transversely therethrough and which serve the function already described above for FIGS. 2–5. A bushing 21 illustrated in FIGS. 6 and 7 is preferably press-fitted into a cavity within resilient load equalizer beam 20 and serves to provide low friction trunnioning on shaft 5. It is within the scope of this invention to include bonding or integral attachment of bushing 21 to the elastomeric beam.

FIG. 6 illustrates resilient beam 20 in a free or unloaded condition with more resilient portions 23 formed at its left and right ends as shown in FIG. 6 in contact with the upper surfaces of supporting spring ends 6 and 7, portions 23 being shown in FIG. 6 in an unloaded state represented by reference numeral 23.

FIG. 7 illustrates these same more resilient portions in a loaded condition over spring ends 6 and 7 and designated numeral 24. Note that these more resilient portions shown at numeral 24 are vertically deflected as a result of the deflection of the adjacent spring ends 6 and 7, while vertical displacement of the beam 20 itself is restrained via the pivotal support at shaft 5.

In the form of the invention just described for FIGS. 6 and 7, the load deflective integrally resilient elastomeric beam 20 will deflect vertically under load, with respect to the position of loaded cross shaft 5 as a result of the deflection of supported spring ends 6 and 7, thereby isolating axle excitations from cross shaft 5 and further isolating axle excitations as between supported spring ends 6 and 7 such that these excitations are not transferred therebetween.

Figure 9:
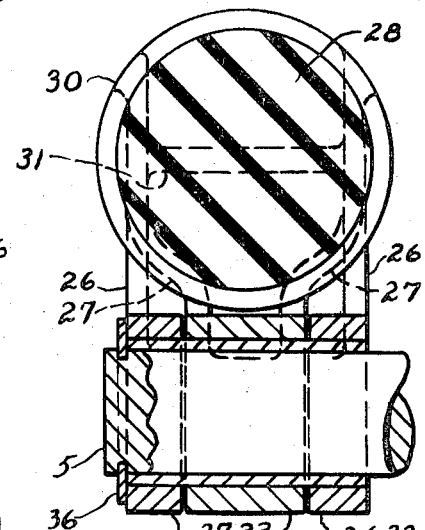
FIG. 9 is a sectional elevational view looking along line 9—9 of FIG. 8.
Figure 8:
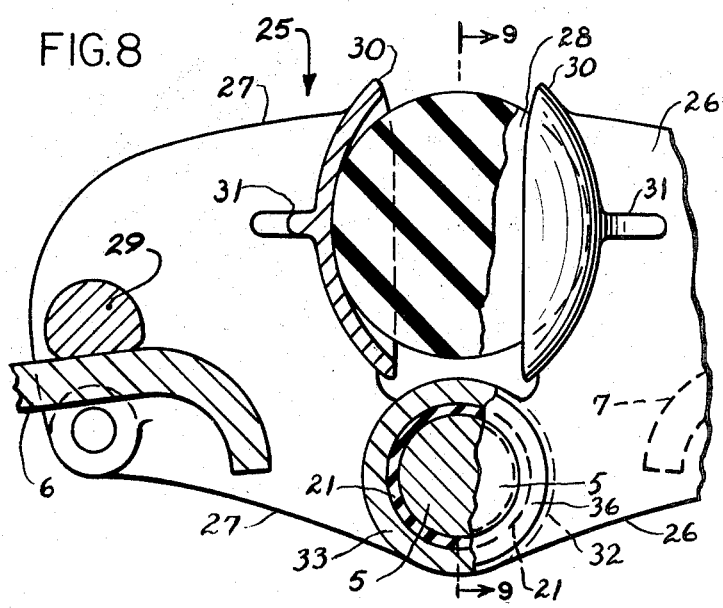
FIG. 8 is a fragmentary sectional elevational view of an articulated beam embodiment of the present invention.

FIGS. 8 and 9 illustrate an optional form of my invention wherein a resilient load equalizer 25 isolates the excitations of each axle of a vehicle from shaft 5 of sprung mass 1 (not shown in FIG. 8) as well as from each opposing axle of the same vehicle. Said equalizer, which is generally referred to by numeral 25, comprises an opposing pair of rocker beams 26 and 27 (FIG. 8) jointly mounted on shaft 5 with a bushing 21 serving both rockers, such that rocker beams 26 and 27 effectively comprise an articulated beam. An elastomeric sphere 28, which interconnects and engages rocker beams 26 and 27, respectively, is disposed and restrained within and between two spherical cups 30, each of which is integrally formed as part of one of said rocker beams 26 and 27. Spherical cups 30 are reinforced outwardly by ribs or webs 31 shown in FIG. 8. Rocker beams 26 and 27 are retained on shaft 5 and bushing 21 by a snap-type retaining ring 36 shown in FIGS. 8 and 9, or by any other conventional end restraint means.

Rocker beam 26 differs from rocker beam 27, as shown in FIG. 9, in that the hub 32 of rocker beam 26 is bifurcated axially to provide space for hub 33 of rocker beam 27, both of which hubs pivot on bushing 21 adjacent shaft 5. Each of rocker beams 26 and 27 include transversely spaced flanges integral with a spring seat 29, a hub 32/33 and spherical cups 30, between which elastomeric sphere 28 is compressibly deflected under load conditions.

The spherical radii of cups 30 are greater than the radius of the elastomeric sphere 28 which is captive between the lips of cups 30. Rebound stops 18, as already described for previous figures, extend transversely through flanges 26 and 27 under adjacent spring ends 6 and 7.

For purposes of illustration, if a 4,000 pound load is assumed at spring ends 6 and 7 at 6 inches from shaft 5 to the center of leaf spring seats 29, and 4 inches vertically between the centers of shaft 5 and spherical elastomer 28, the load on elastomeric member 28 would equal $4,000 \times 6/4 = 6,000$ pounds; while for each inch of vertical travel of each spring seat 29, the deflection of elastomer 28 is $(2 \times 4/6)$ equals 1.33 inches. With a permissible deflection of 33 percent of free diameter of the spherical elastomer 28, its diameter would be $1.33 \text{ inch}/0.33 = 4$ inches.

Once again, a prime object of the resilient load equalizing means described above is to isolate the excitations of each axle from the sprung mass of the vehicle at trunnion shaft 5, as well as from opposing axles, thereby preventing resonance by utilizing isolation of vibrations. In the absence of my invention, conventional suspension structures facilitate the creation of resonance by the compilation of excitations of both axles to the level of the natural frequency of the mass involved, whereupon the undesirable condition of resonance will occur.

The result of this isolation of the excitations as between axles and the sprung mass facilitates the elimination of wheel hop and poor ride. While my invention has been described via reference to specific embodiments illustrated in the drawings hereof, it will be readily apparent to those skilled in the art that various changes in form and in arrangement of parts may be made to suit requirements without departing from the spirit and scope of the invention as defined by the proper scope of the appended claims.

What is claimed is:

1. A multiple axle vehicle suspension structure for cooperative use with a vehicle frame in isolating road-induced excitations within each vehicle axle from each other axle as well as from the vehicle sprung mass, comprising, in combination:
   a shaft member extending substantially transversely with respect to the longitudinal axis of said vehicle frame, said shaft member supporting said frame;
   first and second axles spaced longitudinally from one another beneath said vehicle frame and extending substantially transversely with respect to said longitudinal axis;
   first and second spring members supported, respectively, by said first and second axles; and
   load equalizing means trunnioned upon said shaft member and cooperatively engaging adjacent ends of said first and second spring members for isolating excitations induced within each of said spring members from one another as well as from said vehicle frame, said load equalizing means exhibiting a varying spring rate upon operational deflection thereof and including
   a rocker member pivotally supporting said shaft member, said rocker member including first and second seat portions thereof;
   first and second elastomeric members formed with a varying cross sectional shape and captively engaging said first and second seat portions, respectively, said first and second elastomeric members also engaging said adjacent first and second spring members ends, respectively, each of said elastomeric members being non-torsionally resiliently compressible between the associated spring member end and the rocker member seat portion it is engaging; and
   first and second rebound means each normally engaging one of said adjacent spring member ends for limiting relative movement of said adjacent ends.

2. A multiple axle vehicle suspension structure according to claim 1, wherein said elastomeric members are substantially spherical.

3. A multiple axle vehicle suspension structure according to claim 1, wherein said elastomeric members are semi-phyramidal in cross-section.

4. A multiple axle vehicle suspension structure according to claim 1, wherein said first and second seat portions comprise spherical surfaces.

5. A multiple axle vehicle suspension structure according to claim 1, wherein said first and second seat portions comprise concave spherical surfaces.

6. A multiple axle vehicle suspension structure according to claim 1, wherein said shaft member is disposed substantially equidistant said first and second axles.

7. A multiple axle vehicle suspension structure according to claim 1, wherein said first and second rebound means each comprise a rebound stop member.

8. A multiple axle vehicle suspension structure according to claim 1, wherein said first and second rebound means comprise transversely disposed lugs integral with and depending from a vertical portion of said rocker member and extending outwardly of the width of said first and second spring members and further including a bolt extending through each of said lugs below said spring member ends.

9. A multiple axle vehicle suspension structure according to claim 1, wherein said first and second elastomeric members include an upwardly extending protuberance engaging said seat portions.

* * * * *